United States Patent

Eatwell et al.

[11] Patent Number: 5,828,768
[45] Date of Patent: Oct. 27, 1998

[54] MULTIMEDIA PERSONAL COMPUTER WITH ACTIVE NOISE REDUCTION AND PIEZO SPEAKERS

[75] Inventors: Graham P. Eatwell, Cambridge, United Kingdom; Michael P. McLoughlin, Sykesville, Md.; Stephen F. Hildebrand, Arlington, Va.; William Kokonaski, Columbia, Md.; James W. Hiney, Falls Church, Va.

[73] Assignee: Noise Cancellation Technologies, Inc., Linthicum, Md.

[21] Appl. No.: 241,440

[22] Filed: May 11, 1994

[51] Int. Cl.[6] .................................................. H04R 5/02
[52] U.S. Cl. ........................... 381/333; 381/306; 381/91; 381/122; 381/71.7; 381/190; 381/110
[58] Field of Search ..................... 348/729, 738, 348/552, 836; 381/71, 110, 24, 191, 190, 306, 333, 91, 122, 71.7

[56] References Cited

U.S. PATENT DOCUMENTS

| | | |
|---|---|---|
| 3,423,543 | 1/1969 | Kompanek . |
| 3,548,116 | 12/1970 | Schafft . |
| 3,786,202 | 1/1974 | Schafft . |
| 4,079,213 | 3/1978 | Bage et al. . |
| 4,122,303 | 10/1978 | Chaplin et al. . |
| 4,352,961 | 10/1982 | Kumada et al. . |
| 4,368,401 | 1/1983 | Martin et al. ........................ 381/190 |
| 4,410,761 | 10/1983 | Schickedanz .......................... 381/24 |
| 4,439,640 | 3/1984 | Takaya . |
| 4,558,184 | 12/1985 | Busch-Vishniac et al. ........... 318/191 |
| 4,665,549 | 5/1987 | Eriksson et al. ..................... 381/71 |
| 4,779,246 | 10/1988 | Dietzsch et al. . |
| 4,807,294 | 2/1989 | Iwata et al. ........................ 381/190 |
| 4,817,152 | 3/1989 | Leg .................................. 381/24 |
| 4,998,283 | 3/1991 | Nishida et al. ..................... 381/188 |
| 5,005,201 | 4/1991 | Rumreich et al. .................... 381/24 |
| 5,046,103 | 9/1991 | Warnaka et al. ..................... 381/71 |
| 5,058,170 | 10/1991 | Kanamori et al. . |
| 5,144,451 | 9/1992 | Yamamoto et al. .................. 348/552 |
| 5,267,323 | 11/1993 | Kimura ............................. 381/110 |
| 5,291,556 | 3/1994 | Gale ................................. 381/24 |
| 5,400,414 | 3/1995 | Thiele ............................. 381/190 |

FOREIGN PATENT DOCUMENTS

| | | | |
|---|---|---|---|
| 1-245795 | 9/1989 | Japan ................................ 381/71 |
| 2088951 | 6/1982 | United Kingdom ................... 381/71 |

OTHER PUBLICATIONS

"Beam Forming: A Versatile Approach to Spatial Filtering," IEEE, ASSP Magazine (Apr. 1988).

"Audible Noise Suppression", IBM Technical Disclosure Bulletin, vol. 31, No. 8, Jan. 1989, pp. 256–258. Advertisement for Bond well Superslim 286 Laptop in Damark Catalog, 1990.

*Primary Examiner*—Forester W. Isen

[57] ABSTRACT

This invention involves the integration of piezoelectric speaker panels and microphones into a personal computer with a sound card to form a novel multi-media computer. In addition noise cancellation electronics and algorithms are also applied to enhance performance of the voice recognition system.

21 Claims, 11 Drawing Sheets

MULTIMEDIA PERSONAL COMPUTER WITH ACTIVE NOISE REDUCTION AND PIEZO SPEAKERS

This invention is concerned with a new multimedia computer with a variety of new display, audio, input and active noise reduction features. In many applications that require a sound source, such as multimedia PC's, the size and weight of the speaker systems are particularly cumbersome. The need to carry speakers separately from the personal computer or lap top is especially troublesome when traveling. Conventional loudspeakers, while able to reproduce sound well, require a large amount of space and weight. Space requirements are not easily reduced because of the need for a moving coil to drive the diaphragm. In addition to the problems associated with space and weight, the magnetic field produced by the driving element in conventional speakers would distort the display on a CRT, prohibiting installation of such a speaker in a monitor.

BACKGROUND ART

Piezoelectric loudspeakers have been proposed as an alternative to moving coil loudspeakers. Such a device was described by Martin in U.S. Pat. No. 4,368,401 and later by Takaya in U.S. Pat. No. 4,439,640. Both inventions dealt with attaching a disc shaped piezoelectric to a diaphragm. Martin's device used a thick glue layer (10 to 50% of the carrier plate thickness) between a carrier plate and the piezoelectric ceramic. The adhesive layer served to attenuate resonance. Takaya accomplishes the same through the use of a film with a smaller Q factor than the diaphragm. Both inventors specify disc shape diaphragms and piezoceramic plates. Kompanek in U.S. Pat. No. 3,423,543 uses a plurality of ceramic wafers made of piezoelectric materials such as lead zirconate-lead titanate mixtures of various shapes. Conductive layers are affixed to both sides of the wafer and then glued to a flat plate. Kompanek states that the plate is preferably made of a conductive metal such as steel but may be of plastic or paper with a conductive layer thereon forming the surface.

Another such device in U.S. Pat. No. 4,352,961 to Kumada, attempts to improve the frequency response further by using various shapes for the diaphragm, such as an ellipse. He also claims the ability to form the speaker from transparent piezoceramic materials such as lanthanum doped zirconium titanate so that the speaker can be used in applications such as watch covers and radio dials. He also uses a bimorph to drive the diaphragm rather than a single layer of ceramic. All of the above methods use a flat panel driven by a piezoelectric ceramic device and make no attempt to use a three dimensional structure to improve the sound quality. The diaphragm must be attached to some type of frame and clamped to the frame.

Bage, Takaya and Dietzsch in U.S. Pat. No. 4,779,246 all discuss methods of attaching the diaphragm to a support frame. Early efforts used piezoelectric ceramics to drive conical shapes reminiscent of those found in loudspeakers. Such devices can be found in Kompanek, U.S. Pat. No. 3,423,543 and Schafft, U.S. Pat. Nos. 3,548,116 and 3,786,202. Schafft discusses building a device suitable for use in loudspeakers. This device is of much greater complexity than flat panel speakers and is not suitable for applications where a low profile speaker is needed. In order to constrain the center of the diaphragm from moving, Bage in U.S. Pat. No. 4,079,213 uses an enclosure with a center post. He claims that this reduces the locus of nodal points to the location of the center post and therefore improves the frequency response of the device. The enclosure is used to support the center post and has openings to provide for pressure relief, and does not improve the acoustic performance.

The use of microphone arrays has been discussed by Kanamori in U.S. Pat. No. 5,058,170 using both spatial and temporal two dimensional filters. This invention includes the application of a linear array in lap top computers and video display units (VDUs) for desk top applications. Beam forming with sensor elements is also discussed in the open literature in a paper by Van Veen and Buckley, entitled "Beam forming: A versatile Approach to Spatial Filtering", IEEE, ASSP Magazine April 1988.

BRIEF DESCRIPTION OF INVENTIION

Current multimedia computers are plagued with two problems. One problem is the portability of speaker systems currently used in multi-media systems. A second problem is that voice recognition systems in multi-media computers do not perform well in noisy environments. Voice recognition is a process by which human speech is digitized and analyzed to identify certain words or phrases. This would enable the user to speak commands to the computer that are currently executed with the keyboard or the mouse. This process requires excellent signal to noise ratios from the microphone. For this reason, voice recognition systems require high quality microphones with good sensitivity, flat frequency response and low noise floors. The current means of achieving this is through the use of a pressure gradient microphone. Unfortunately this requires the speaker to place the microphone in very close proximity to his mouth, since the signal produced by a pressure gradient microphone degrades with the square of distance from the microphone.

This invention provides solutions to both of these problems. The application of piezoelectric elements made from PZT to the internal walls of a desk top computer or to the inside of the display panel of a lap top computer converts these elements into speakers. One objective of this invention is to provide a three-dimensional loudspeaker driven by a plurality of piezoelectric wafers that yields efficient conversion of electrical energy into acoustical energy. A further objective is to reproduce stereophonic sound by using multiple flat panel speakers integrated into a three-dimensional structure. Another objective is to provide an enclosure that can be populated with electronics, such as for a multimedia PC, video monitor, television, laptop computer, radio, etc., while at the same time serving as a loudspeaker.

An additional objective is to use the volume of the enclosure to improve the quality of stereophonic reproduction. In particular, the air mass can be used to improve the low frequency performance of the speaker system. Openings in the box are used both for tuning and to allow airflow for both convective and forced air cooling. A duct is added to the opening to direct airflow, adjust the acoustical properties of the speaker and provide a means of canceling fan noise. Still another objective is to provide a means for integrating the diaphragm with a mounting frame so that the speaker can be used as a lid to an enclosure. By building the speakers into the computer housing or the display, the multi-media computer can be made considerably more portable.

In addition to converting the PC case of a lap top display into a speaker system, and reducing fan noise, a further objective is to provide a built-in variable sensitivity microphone into the display housing for voice processing application. Voice recognition is sensitive to voice levels, Therefore, a key in improving voice recognition is a means of controlling microphone sensitivity. A micro machined microphone, that has a sensitivity which is determined by its bias voltage, is one way of achieving this. This also provides the means of determining the range over which the microphone will listen. By adjusting the microphone sensitivity and by varying software parameters the user can determine how close or how far away from the computer he wishes to operate his voice recognition system. The application of this highly sensitive and controllable microphone allows for hands free operation of voice recognition systems. In fact, recent experiments with existing voice recognition software has yielded a 100% success rate at distances of 4 feet away from the microphone. At distances as large as 12 feet away, voice recognition rates were as high as 70%. The second advantage of the micro machined microphone is that the microphone is extremely small and can be built directly onto existing circuitry within the computer. The small size of the microphones would also permit the formation of microphone arrays that could be used to form a high degree of directionality. The variable sensitivity possible with micro machined microphones provides a means by which the array can be controlled in range as well as direction.

By building the microphone into the lap top version of the personal computer and by turning the display panel into a speaker system a multi-media system can be made as portable as any existing lap top computer. The introduction of the microphone also provides a means of equalizing the piezoelectric speaker to improve sound quality.

Accordingly, it is an object of this invention to provide a new improved multimedia computing system.

Another object is to utilize piezo elements in a new relationship as speakers on planar surfaces.

Another object is to combine active noise reduction and piezos in a personal computer to reduce fan noise, create a quiet zone around the microphone and/or the microphone arrays, improve voice recognition performance and improve duct tuning.

A further object of this invention is to use piezos in personal computers to aid audio reproduction and give better mid-range performance.

Yet another object of this invention is to provide piezo speakers for use in personal computers, monitors and the like to facilitate slimmer styling and light weight construction.

Another object of this invention is to employ micro machined microphones with improved sensitivity to enhance operation of personal computers with voice recognition circuits.

A still farther object of this invention is to provide high sensitivity, flat frequency response microphones for computers and monitors.

DESCRIPTION OF THE PREFERRED EMBODIMENTS OF SPEAKER SYSTEM

Figure 1:
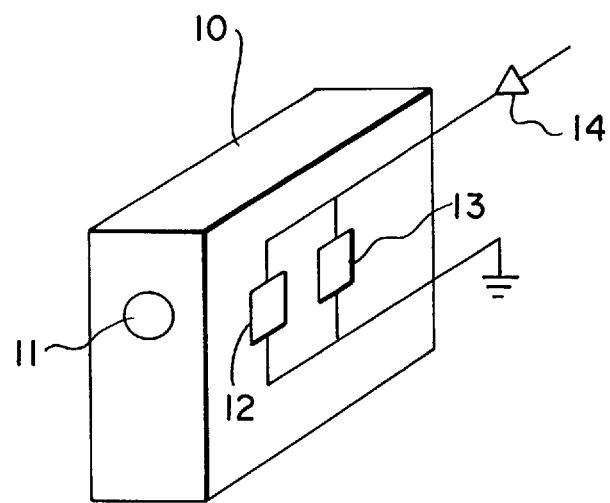
FIG. 1 is a rear view of the preferred embodiment.
Figure 2:
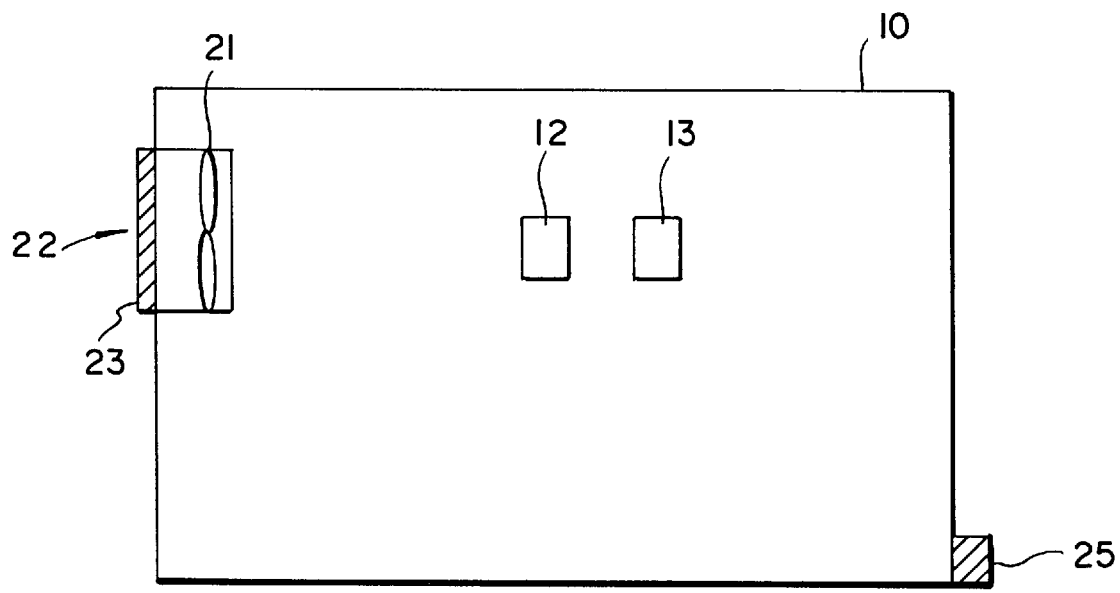
FIG. 2 is a side view of the interior of the preferred embodiment.
Figure 3:
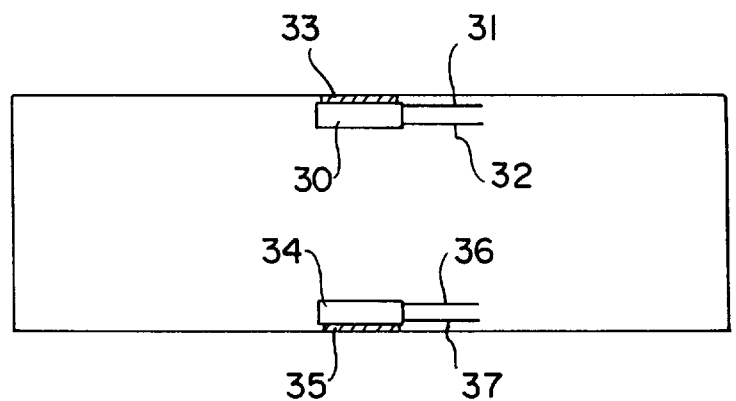
FIG. 3 is a cross section of the preferred embodiment showing a monolithic patch on each panel.
Figure 4:
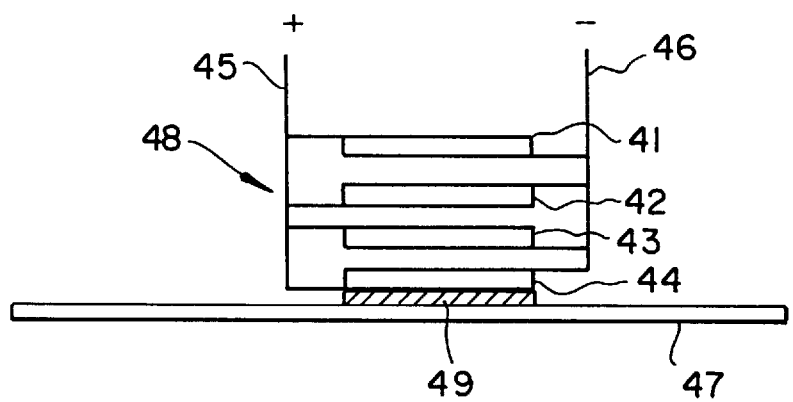
FIG. 4 is a cross section of one of the piezoceramic driven panels showing a multilayer patch.

FIG. 1 illustrates the configuration of the preferred embodiment. The speaker enclosure 10 is made of metal or plastic. In experiments, the enclosure was made of 3/16" plastic. Overall dimensions were 10"×16"×6" and were chosen to represent a typical personal computer enclosure. Each side was cut individually and then glued together. A variety of other methods such as vacuum forming can also be used. An opening in the rear 11 serves as an air inlet in which a fan for cooling is placed. A second opening in the front (not shown) allows air to exit the enclosure. Piezoceramic patches 12, 13 are glued to the large side of the enclosure and are electrically connected to a power amplifier 14. The number of piezoceramic patches can be varied depending on the type of material used in the enclosure and can be attached on either the inside and/or outside of the enclosure. The large sides of the enclosure were selected because they would radiate sound most efficiently. It is possible to attach piezoceramic patches to the smaller sides as well. For the demonstration system a 30 watt amplifier was used along with a 20:1 step up transformer. Because of the low power consumption a much smaller amplifier would normally be used. The input to the amplifier 14 is connected to an audio signal generator. A side view of the enclosure 10 is shown in FIG. 2. The rear of the enclosure contains an opening 22 for a fan 21 covered by a grill and air filter 23. The interior of the enclosure contains electronics such as those found in a personal computer. Piezoceramics 12, 13 are attached to the large panel. The front vent 25 is also shown. Location of the fan and vent openings are not critical to performance of the system. A cross section of the enclosure 10 is shown in FIG. 3. Piezoceramic patches 30, 34 are adhered to the sides of the enclosure with adhesive layers 33, 35. Electrodes 31, 32, 36, and 37 made of copper, are attached to top and bottom sides of the piezoceramic patch. When a voltage is applied across the top 31, 36 and bottom 32, 37 electrodes a change in the length of the piezoceramic patch 30, 34 will create a strain that will result in a bending of the panel. The direction of the panel deflection depends on the polarity of the voltage. In some applications it may be desirable to reduce voltage levels needed to drive the piezoceramic patches for safety or other reasons. In this case a multilayer piezoceramic patch of the type described U.S. application, Ser. No. 08/057,944, incorporated by reference herein, can be used. FIG. 4 illustrates a four layer actuator. Four layers of piezoceramic material 41, 42, 43 and 44 are bonded together and then adhered to the panel 47 with an epoxy. Electrodes 45,46 are placed between each layer such that when a voltage is applied between them the polarity alternates between each layer.

Figure 5:
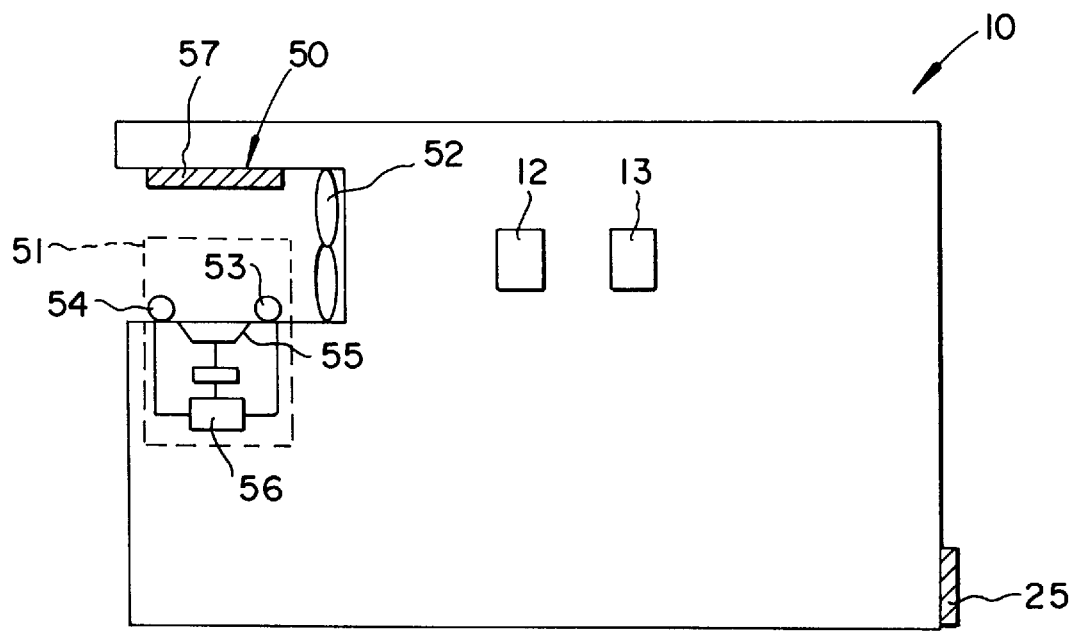
FIG. 5 is a side view of another embodiment in which a duct is added to the fan for the purpose of reducing fan noise.
Figure 6:
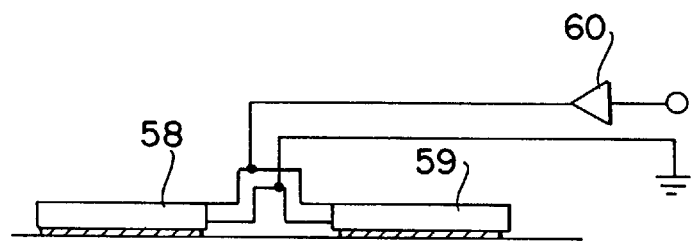
FIG. 6 illustrates the means of driving two piezoelectric elements. Also illustrated in FIG. 6 is a possible location of a micro machine microphone, FIG. 7 details the drive circuitry for the piezoelectric speaker system (the drawing illustrates a single audio channel, stereo is achieved through two sets of circuitry)

FIG. 5 shows still another embodiment in which a duct 50 is added to the cooling fan 52. The duct 50 serves two purposes. First, the volume of air in the duct is used to tune the enclosure in order to provide improved low frequency response. Such methods are common in loudspeaker enclosure design. Second, an active noise reduction system 51 is added to attenuate noise from the cooling fan 52. One method involves an adaptive feed forward system such as that described in U.S. Pat. No. 4,122,303 to Chaplin. An upstream microphone 53 senses noise from the fan 52 and input to a digital signal processor (DSP) 56. A second microphone 54 monitors the residual noise after cancellation and is also an input to the DSP 56. The DSP 56 calculates the canceling signal and outputs it to a loudspeaker 55 that is capable of generating a noise spectrum identical to that of the fan 52. Material 57 such as fiberglass or open cell foam can be used to passively reduce noise FIG. 6 illustrates the driving of two piezoelectric electric 58, 59 driven in by the same audio amplifier 60. The devices are connected in parallel. Such an arrangement is required when the panel being driven is particularly stiff.

Figure 7:
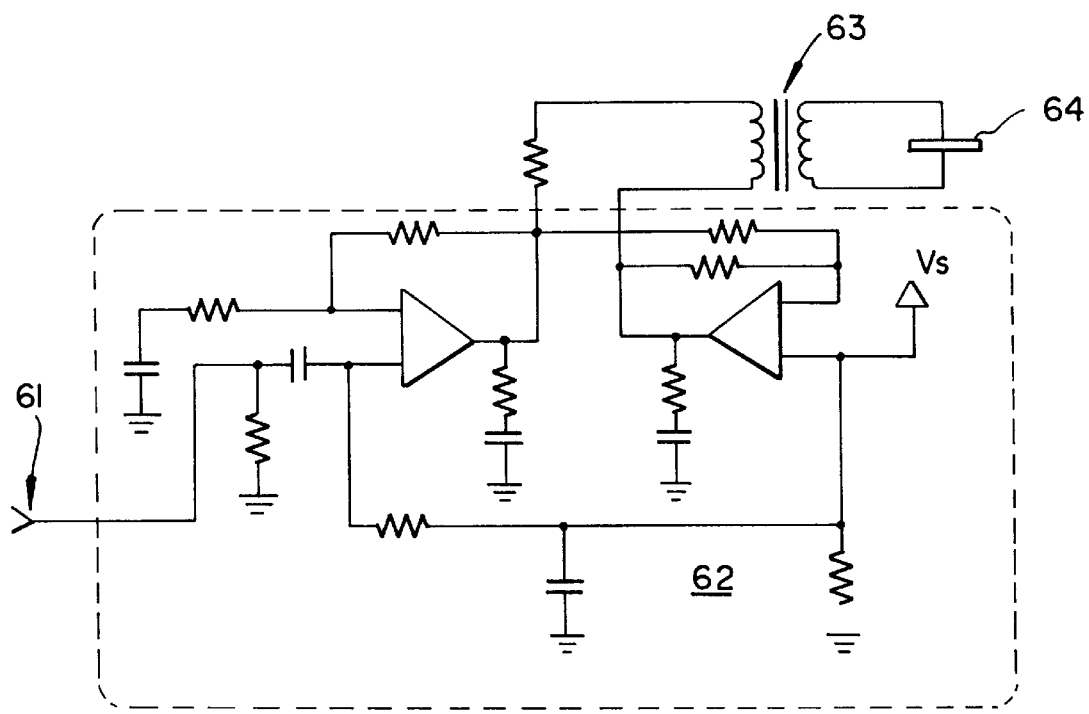

FIG. 7 illustrates the basic circuitry of the piezoelectric speaker system. The audio output from the computer sound card is fed into the input 61 of a standard audio amplifier 62. The output from the amplifier is fed into a step up transformer 63, before going into the piezoelectric elements 64 such as those available from Morgan-Matroc Corporation. The step up in voltage is required since the piezoelectric elements require higher voltage than conventional loud speakers. The amplifier 62 is commercially available as PA-26 APEX from APEX Corporation as a linear amplifier.

Figure 8:
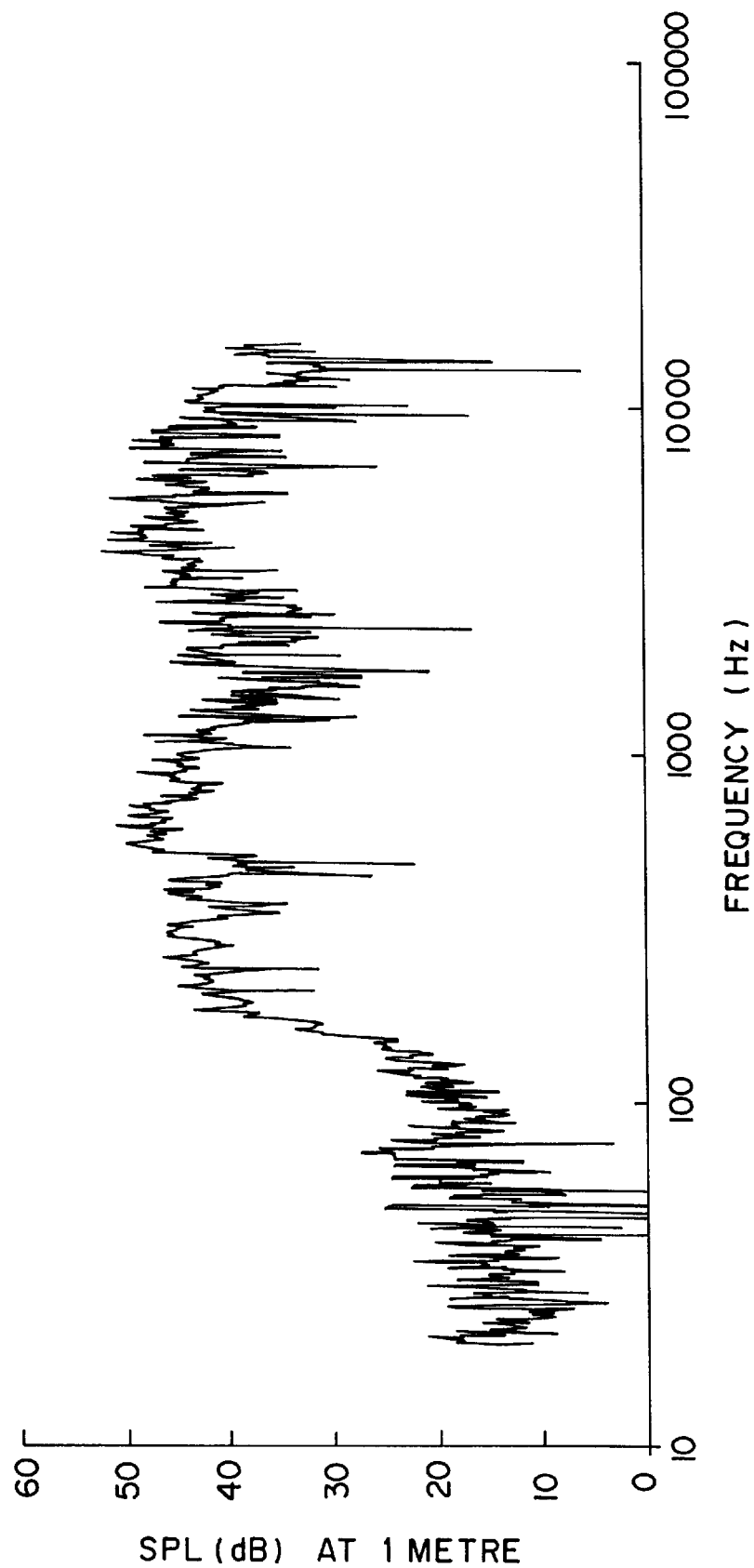
FIG. 8 is a plot of the frequency response of the piezoelectric speaker system.

FIG. 8 is a plot of the frequency response of the piezoelectric speakers in a PC case similar to the one depicted in FIG. 1. The curve indicates that the frequency response is roughly flat from 200 Hz to 10 Kz.

Figure 9:
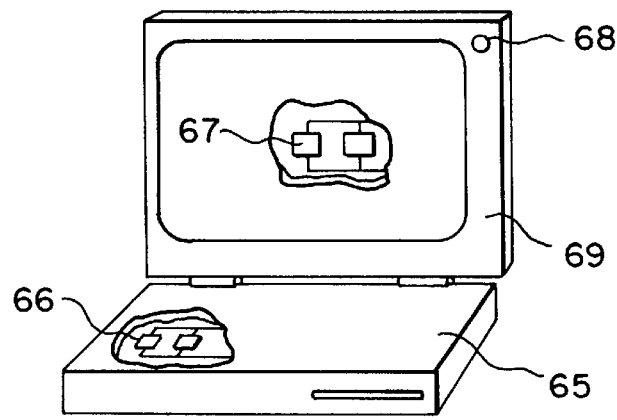
FIG. 9 illustrates the concept of placing the piezoelectric elements and a microphone into a lap top computer.

FIG. 9 illustrates another embodiment of the invention for a lap top computer application. The lower case 65 has piezoelectric elements 66 placed in the lower corner. Piezoelectric elements 67 and a microphone 68 are placed in the lid 69 of the lap top computer. This is one means of achieving a portable multimedia system.

Figure 10:
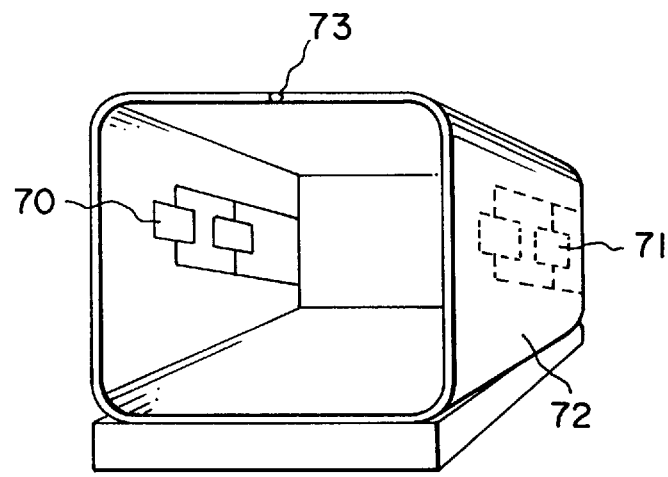
FIG. 10 illustrates the concept of placing the piezoelectric elements and a microphone into a VDU for a desk top computer.

Another embodiment of the invention is shown in FIG. 10 for a video display unit (VDU) to be used with a desk top computer. The piezoelectric elements 70, 71 are placed on the inner walls of the VDU shell 72. A microphone 73 is placed on the top of the VDU. The use of piezoelectrics in the case of a VDU containing a cathode ray tube or CRT is particularly important since the magnetic drives in conventional speakers makes their use in VDU's impossible, due to the effect of the magnetic field on the display. The application of the piezoelectric elements and the microphone is a method of producing a self contained multimedia system for desk top applications.

Figure 11:
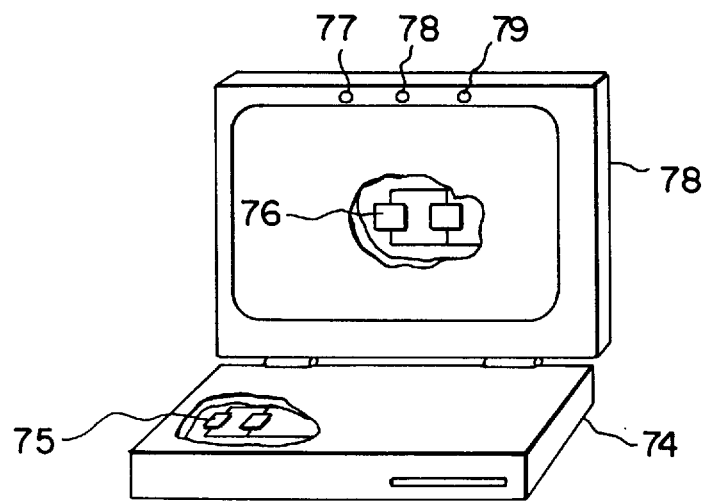
FIG. 11 illustrates the concept of a phased array of elements into a lap top computer with piezoelectric speakers.

FIG. 11 illustrates another embodiment of the invention for a lap top computer application. The lower case 74 has piezoelectric elements 75 placed in the lower corner. Piezoelectric elements 76 and a microphone array consisting of three microphones 77, 78, 79 are placed in the lid 80 of the lap top computer. This is one means of achieving a portable multimedia system where the microphone system can be highly directional to reduce the effects of background noise in the voice recognition system. An active noise reduction system 107 is used to enhance provision of a quiet zone.

Figure 12:
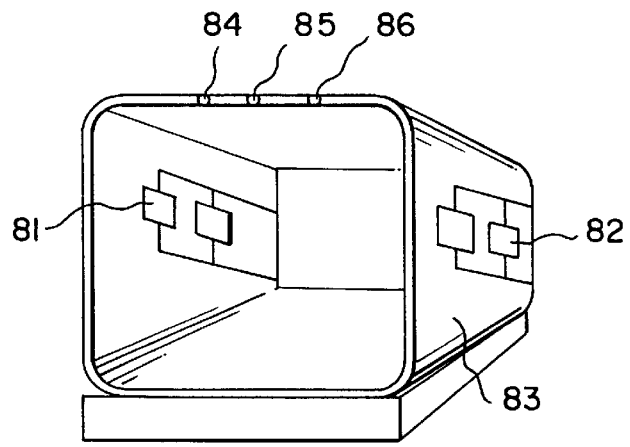
FIG. 12 illustrates the concept of a phased array of elements into a VDU for a desk top computer with piezoelectric speakers.

FIG. 12 illustrates another embodiment of the invention for a VDU used with a desk top computer. The piezoelectric elements 81, 82 are placed on the inner walls of the VDU shell 83. A microphone array consisting of three microphones 84, 85, 86, is placed on the top of the VDU. This produces a self contained multimedia system for desk top applications where the micro system provides a high degree of directionality to reduce the effects of background noise.

Figure 13:
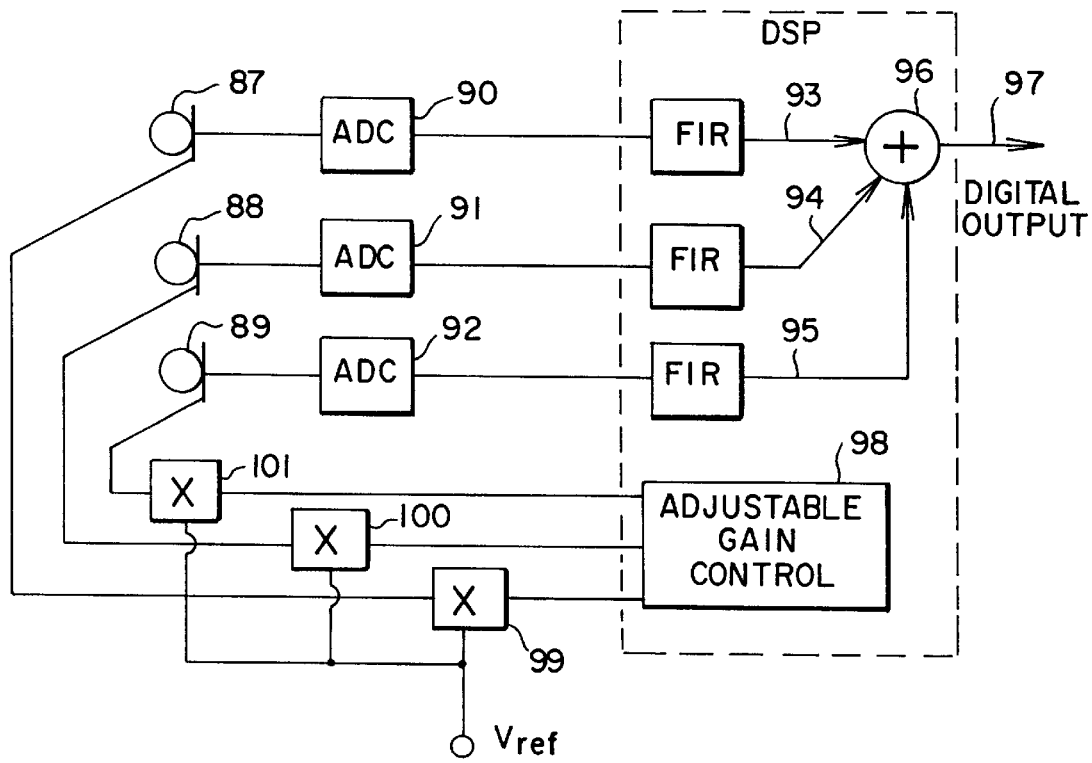
FIG. 13 illustrates the means by which a microphone array could be used to control listening direction and range.

FIG. 13 illustrates the means for processing the microphone array data. Three microphones 87, 88, 89 are fed into analog to digital converters 90, 91, 92. The output from the analog to digital converters feed into finite impulse filters 93, 94, 95 filter. The output from the filters are summed at a summing junction 96 to produce the composite digital output 97. An automatic gain adjustment algorithm 98 is used to control the output of multiplying digital to analog converters 99, 100, 101. The analog to digital converters provide a means for changing the bias voltage on the micro machined microphones. By changing the bias voltage the sensitivity of each element is controlled (signal gain may also be controlled on electret microphones but requires additional circuitry). This, in conjunction with the digital signal processor, provides a means of controlling the range, as well as directivity in the microphone array. The filters and the gain adjustments can also reside on a single DSP(digital signal processor) chip such as an Analog Devices MSP55 with stereo input and output. An additional embodiment includes the analog to digital and the digital to analog converters on a ASIC chip along with the digital signal processor.

Figure 14:
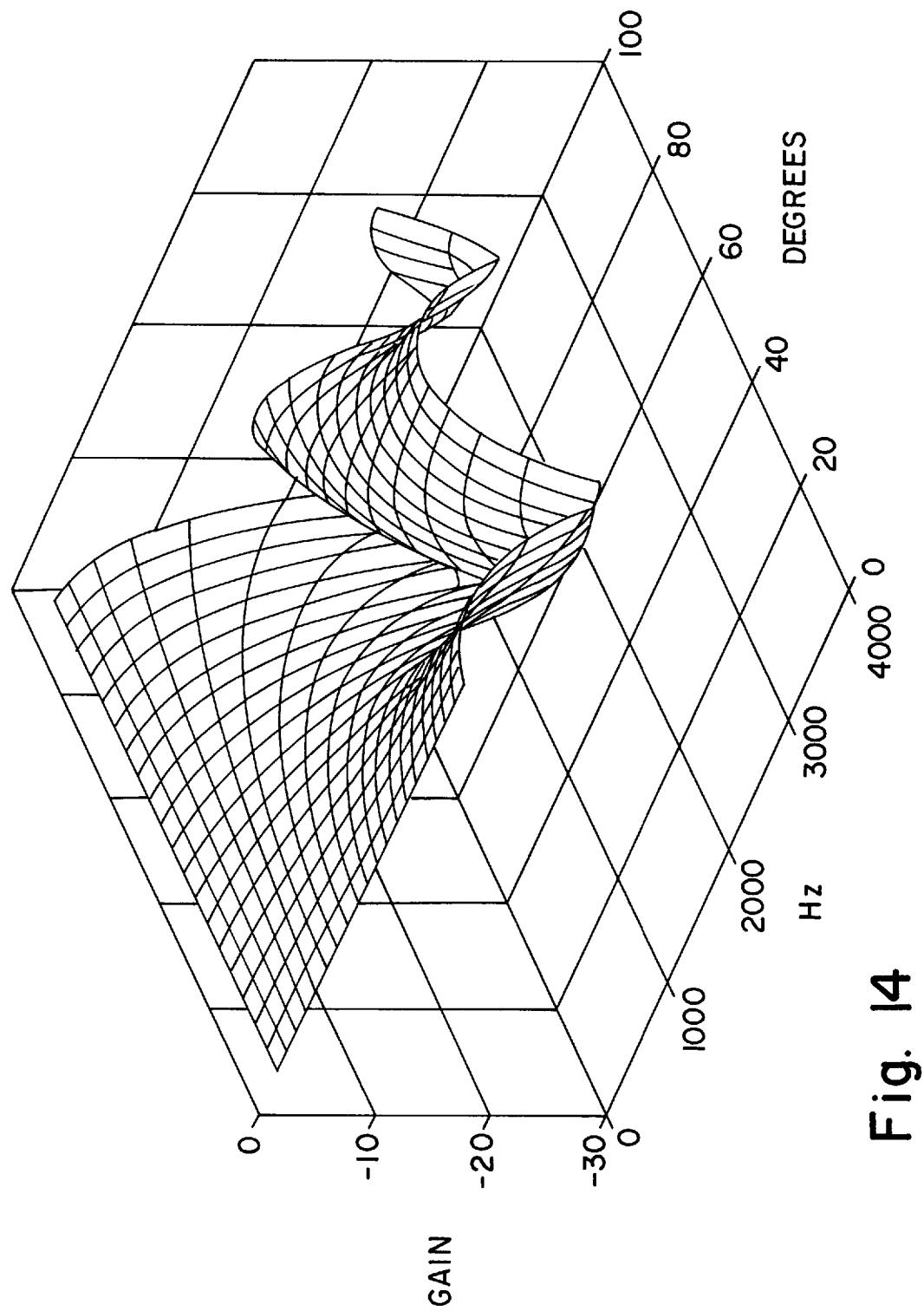
FIG. 14 is plot of microphone array gain as a function of angle and frequency.

FIG. 14 is a plot of the directivity of a microphone array consisting of three microphone elements placed 7.5 cm apart. Directivity is calculated at 0.5 meters away from the array. The plot displays gain as function of frequency and angle of incidence of the impinging sound, zero degrees being normal to the array.

Figure 15:
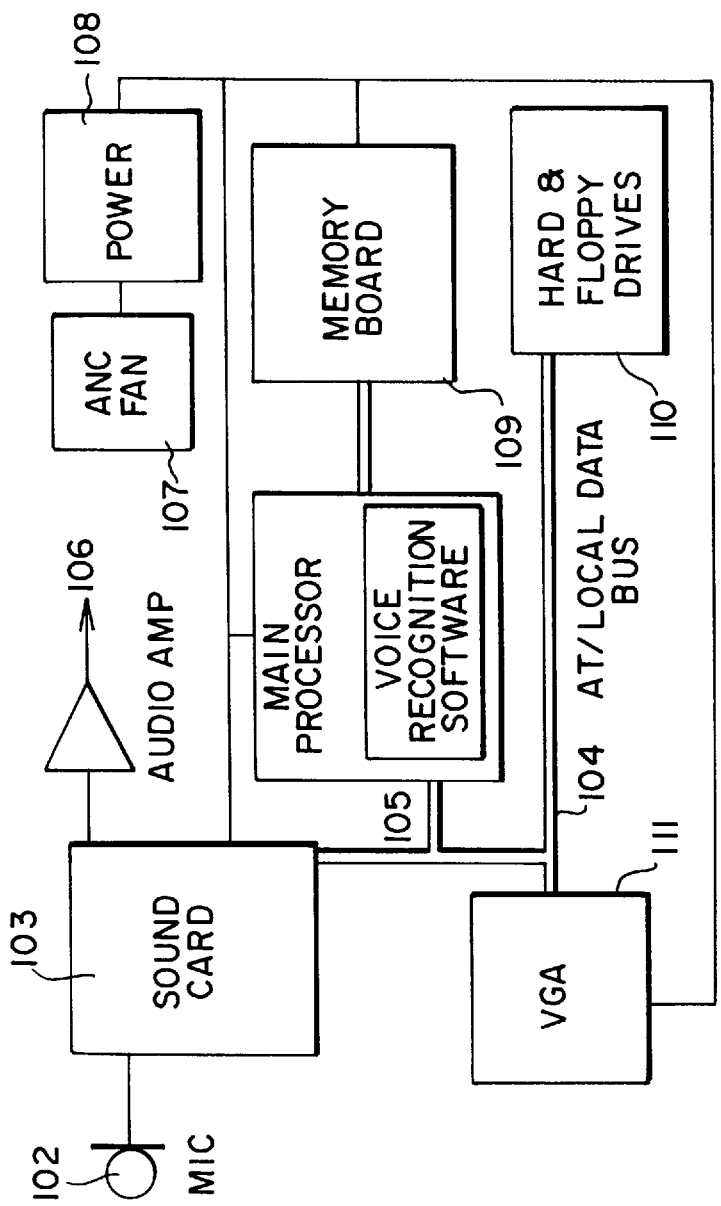
FIG. 15 is a diagram of the multimedia components integrated into a basic PC system.

FIG. 15 is a block diagram of the basic multimedia computer, illustrating the integration of the multimedia features and the active noise control into a typical PC system. The microphone input 102 is fed into the sound card where it is filtered and converted into digital information. The digital data is transmitted across the AT/Local Bus 104 to the main processor 105 where the voice recognition software resides. The sound card also converts digital audio information from the main processor into an analog signal which is fed into the audio amplifier 106 that drives the piezoelectric speaker. Two audio channels are required for stereo operation. The active noise reduction (ANR) circuitry 107, is used to eliminate the fan noise in the power supply 108. The ANR is also used to quiet the area near the microphone to reduce the effects of background noise in the voice recognition. The ANR is also used to reduce noise generated by the hard and floppy disk drives 110. The ANR is illustrated in block diagram form in FIG. 16 and 17. The ANR is either purely analog or digital signal processor, DSP, based depending on the flexibility and degree of performance required. The RAM memory board 109, the hard and floppy disk drives 110, and the video graphics adapter VGA 111 are shown to detail the complete PC system.

Figure 16:
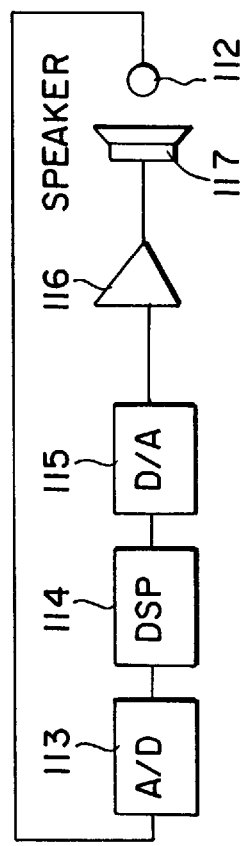
FIG. 16 illustrates a digital version of active noise cancellation.

FIG. 16 illustrates a digital signal processor based version of the active noise cancellation system. The microphone output 112 is fed into an analog to digital converter 113 which provides a digital version of the noise spectrum to the digital signal processor 114. The digital signal processor contains an algorithm designed to analyze the noise and generate the appropriate wave form to cancel the noise. The drive signal calculated on the DSP is converted to an analog audio signal by the digital to analog converter 115, which is fed into an audio amplifier 116 and then into the speaker 117.

Figure 17:
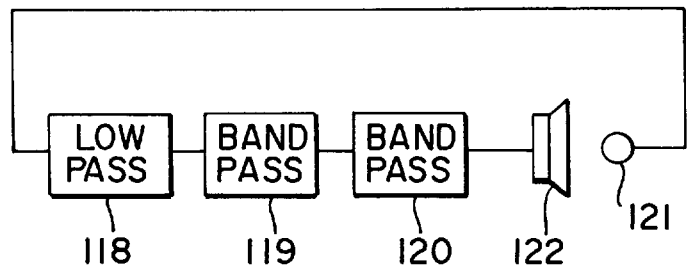
FIG. 17 is a diagram of an analog version of active noise cancellation.

FIG. 17 illustrates the cascade of low pass 118 and band pass 119, 120 stages of the signal conditioning segments of the analog active noise cancellation system. The low pass filter is essentially a single operational amplifier with the appropriate resistors and capacitors. The band pass filters are variable state filters consisting of four operational amplifiers and the appropriate resistors and capacitors. The microphone 121 and the speaker 122 make up the essential elements of the electro-acoustic feedback loop. By choosing a very broad band microphone to assure linearity in phase and by placing the foam filled cavity behind the speaker to improve the linearity of the speaker, the remaining non linearity in the systems are compensated for by adjusting the properties of the low pass, and the band pass filters. The properties of the low pass and band pass filters are adjusted by changing the values of resistors and capacitors in the each of the filters.

Figure 18:
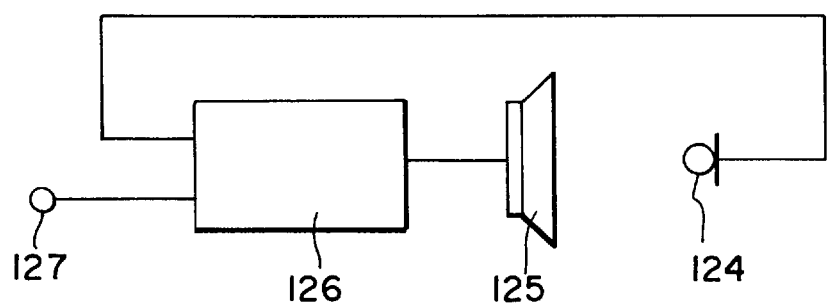
FIG. 18 is a block diagram of the equalization circuit of this invention.

FIG. 18 illustrates the means of achieving equalization of the speaker system using the microphone 124 as part of an audio feedback circuit. The signal from the microphone 124 represents the electrical equivalent of the acoustic output of the piezoelectric speaker 125. The equalizer 126 compares the microphone signal to the electrical audio input 127 normally used to drive the speaker. The drive of the speaker is adjusted by the equalizer until the electrical signal from the microphone matches the intended electrical audio signal as closely as possible. The equalizer may be realized through the use of a differential operational amplifier or a FIR filter.

Figure 19:
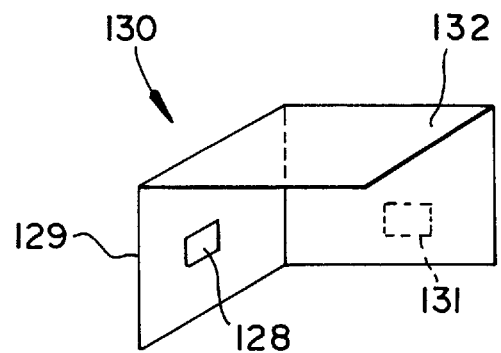
FIG. 19 is a perspective view of a non-enclosure piezo driven structure.

FIG. 19 illustrates the application of a piezo element 128 to one side 129 of an open three-dimensional structure 130 to form a directional speaker system. An additional element 131 can be placed on the adjacent side 132 to create stereophonic sound. This is a non-enclosure structure.

Figure 20:
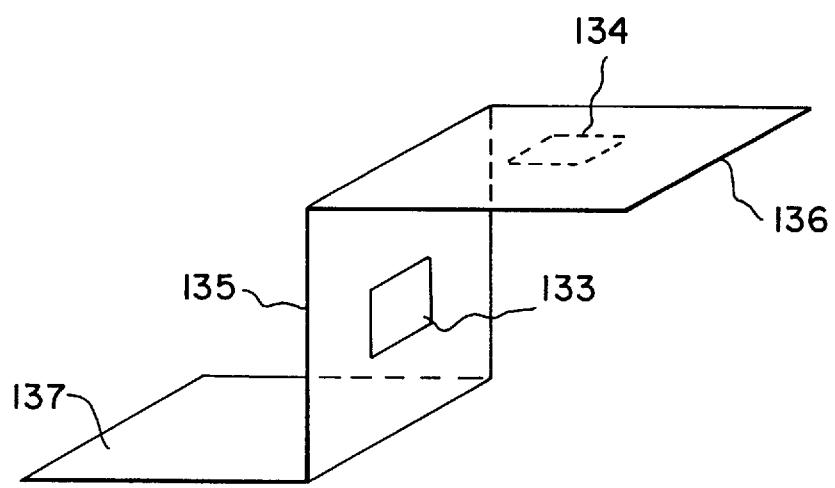
FIG. 20 is a perspective view of a second non-enclosure driven structure.

FIG. 20 illustrates another embodiment of an open speaker system. Piezoelectric elements 133, 134 are placed on adjacent sides 134, 135 of panels to form a dihedral corner reflector. The third surface 137 provides a support means for the speaker system. Again, a non-enclosure structure is used.

Having described the invention, what is claimed is:

1. A laptop computer employing integrated piezoelectric panels and microphone in a novel arrangement, said computer comprising a main housing means, lid means physically and operatively connected to said main housing means, said lid means being configured as a hollow enclosure, display means on said lid means and adapted to provide a visual display, piezoelectric panel means on said lid means and adapted in conjunction with said hollow enclosures, to provide an audio output, control means situated within said main housing means and adapted to drive said piezoelectric audio output and said visual display means in response to input signals, input means adapted to provide inputs to said control means, wherein said input means includes a voice recognition means and microphone means adapted to function with said voice recognition means to produce input signals to said control means, and wherein said control means includes analog to digital conversion means adapted to process said microphone means inputs, finite impulse filter means adapted to receive the output from said conversion means, summing means adapted to receive the output of said impulse means and adapted to produce a composite digital output, automatic gain adjustment means adapted to process said composite digital output, and multiplying digital to analog conversion means adapted to receive said processed output and to change the sensitivity of said microphone means.

2. A computer as in claim 1 wherein said input means includes at least one microphone means.

3. A computer as in claim 2 wherein said input means consists of an array of electret microphones and including variable gain amplification means to adjust their sensitivity.

4. A computer as in claim 3 and including a voice recognition means adapted to function with said microphone array to produce selected inputs to said control means.

5. A computer as in claim 4 and including active noise control means adapted to improve the performance of said voice recognition means and to create a zone of quiet adjacent said microphone array.

6. A computer as in claim 1 wherein said filter means and gain adjustment means reside on a single digital signal processing chip.

7. A computer as in claim 1 wherein said piezoelectric panel means comprise multiple piezoelectric elements mounted on said lid means adjacent said display means.

8. A computer as in claim 7 and including additional piezoelectric elements mounted in said main housing means.

9. A computer as in claim 1 and including additional piezoelectric panel means in said main housing means adapted to produce a second audio output which, in conjunction with said first audio output produces a stereophonic effect.

10. A computer as in claim 1 including multiple microphones mounted adjacent said display means on said lid means.

11. A computer as in claim 10 wherein said control means includes integrated circuit means with analog to digital and digital to analog converters, and said microphone means comprising an array of microphones, said integrated circuit means adapted to control said microphones.

12. A computer as in claim 1 wherein said control means includes a computer sound card means, an audio amplifier and a step-up transformer means, said computer sound card means adapted to produce an audio output which is fed into said audio amplifier and through said step-up transformer means to said piezoelectric means to cause said latter means to vibrate to produce said audio output.

13. A computer as in claim 1 wherein said microphone means comprises a micromachined microphone, said digital to analog conversion means adapted to change the bias voltage on said microphone to thereby control its sensitivity and consequently, the range and directivity thereof.

14. A computer as in claim 1 wherein said control means also includes active noise control means.

15. A computer as in claim 14 and including power supply means with a cooling fan means, said active noise control means adapted to attenuate noise generated by said fan means.

16. A computer as in claim 14 wherein said active noise control means is adapted to attenuate noise in the area of said microphone means so as to eliminate the effects of background noise in said voice recognition circuit means.

17. A computer as in claim 14 and including a disk drive means associated with said control means and adapted to produce audio signal inputs into said control means to drive said transducing means, said active noise control means adapted to attenuate noise associated with said disk drive means.

18. A computer as in claim 14 wherein said active noise control means includes a digital signal processor means adapted to analyze the offending noise and generate a counter wave to cancel the offending noise.

19. A personal computer system having unique transducing means to thereby enhance audio inputs and outputs, said system including (a) a three dimensional enclosure means with a display means thereon, said enclosure means having multiple planar surface wall means, (b) a transducing means comprising a piezoelectric element means mounted on at least one of said planar surface means, said transducing means adapted to vibrate the enclosure means and said enclosure means adapted to act as a speaker in response to activation of said transducing means, (c) control means adapted to receive inputs and convert them to visual display and audio outputs, (d) input means adapted to produce inputs to said control means, wherein input means includes a voice recognition circuit means and microphone means adapted to function with said voice recognition circuit means to produce input signals to said control means; wherein said control means includes analog to digital conversion means adapted to process said microphone array inputs, finite impulse filter means adapted to receive the output from said conversion means, summing means adapted to receive the output of said impulse means and adapted to produce a composite digital output, automatic gain adjustment means adapted to process said composite digital output, and multiplying digital to analog conversion means adapted to receive said processed output and to change the sensitivity of said microphone means.

20. A system as in claim 19 wherein said microphone means comprises a micromachined microphone, said digital to analog conversion means adapted to change the bias voltage on said microphone to thereby control its sensitivity and consequently, the range and directivity thereof.

21. A system as in claim 19 wherein said filters and gain adjustments comprise a single digital signal processing chip.

* * * * *